US010707501B2

(12) United States Patent
Ohira (10) Patent No.: US 10,707,501 B2
(45) Date of Patent: Jul. 7, 2020

(54) ION EXCHANGER (71) Applicant: TOYOTA BOSHOKU KABUSHIKI KAISHA, Kariya-shi, Aichi-ken (JP)

(72) Inventor: Junko Ohira, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 468 days.

(21) Appl. No.: 15/445,114

(22) Filed: Feb. 28, 2017

(65) Prior Publication Data
US 2017/0263953 A1 Sep. 14, 2017

(30) Foreign Application Priority Data

Mar. 9, 2016 (JP) .................. 2016-045582

(51) Int. Cl.
*H01M 8/04044* (2016.01)
*H01M 8/0662* (2016.01)
(Continued)

(52) U.S. Cl.
CPC ...... *H01M 8/04044* (2013.01); *B01D 15/361* (2013.01); *B01J 47/022* (2013.01);
(Continued)

(58) Field of Classification Search
CPC .......... H01M 8/04044; H01M 8/0687; H01M 8/04029; H01M 2250/20; B01J 47/022;
(Continued)

(56) References Cited

U.S. PATENT DOCUMENTS 656,043 A * 8/1900 Paterson ................ B01D 24/14
210/108
1,987,847 A * 1/1935 Flood ................... B01D 27/005
165/119
(Continued)

FOREIGN PATENT DOCUMENTS

JP 49-136066 11/1974
JP 62-14948 1/1987
(Continued)

OTHER PUBLICATIONS

Office Action issued in Japan Counterpart Patent Appl. No. 2016-045582, dated May 14, 2019, along with an English translation thereof.

*Primary Examiner* — David C Mellon
(74) *Attorney, Agent, or Firm* — Greenblum & Bernstein, P.L.C.

(57) ABSTRACT

An ion exchanger includes a case that is provided with an opening, an intake port, and a discharge port. The opening opens upward in the case. Coolant is drawn into the lower portion of the case through the intake port and discharged through the discharge port. An ion exchanging resin member and a cap are provided in the case. The ion exchanging resin member removes ions from the coolant. The cap is detachably attached to the case and closes the opening of the case. The ion exchanger further includes a tube member that is arranged to extend vertically in the case. The lower end aperture of the tube member is connected to the discharge port of the case. The upper end aperture of the tube member faces the inner top surface of the lid portion of the cap.

6 Claims, 5 Drawing Sheets

(51) Int. Cl.
*B01D 15/36* (2006.01)
*B01J 47/022* (2017.01)
*H01M 8/04029* (2016.01)

(52) U.S. Cl.
CPC ..... *H01M 8/04029* (2013.01); *H01M 8/0687* (2013.01); *H01M 2250/20* (2013.01)

(58) Field of Classification Search
CPC ......... B01J 43/00; B01J 45/00; B01D 15/361; B01D 15/10; B01D 15/14; B01D 15/18; B01D 15/22; B01D 15/362; B01D 15/363; B01D 15/364; B01D 35/027; B01D 35/14; B01D 35/147; B01D 35/30; B01D 35/306; B01D 35/34; C02F 1/28; C02F 1/42; C02F 2001/422; C02F 2001/425; C02F 2001/427; C02F 2201/002; C02F 2201/007
See application file for complete search history.

(56) References Cited

U.S. PATENT DOCUMENTS

| | | | | |
|---|---|---|---|---|
| 2,886,180 | A * | 5/1959 | Morgan | B01D 29/15 210/438 |
| 2,955,067 | A * | 10/1960 | McBurney | A24B 3/14 162/164.2 |
| 3,266,628 | A * | 8/1966 | Price | B01D 29/018 210/94 |
| 3,415,382 | A * | 12/1968 | Martin | B01D 27/02 210/282 |
| 4,444,247 | A * | 4/1984 | Franck | F01P 11/06 123/41.1 |
| 4,561,979 | A * | 12/1985 | Harms | B01D 29/21 210/438 |
| 4,693,820 | A * | 9/1987 | Baxter | B01D 29/15 210/232 |
| 6,852,232 | B2 * | 2/2005 | Martin | B01D 24/08 210/661 |
| 8,016,125 | B2 * | 9/2011 | Lockledge | F01M 11/03 210/167.02 |

FOREIGN PATENT DOCUMENTS

| | | |
|---|---|---|
| JP | 08-294684 | 11/1996 |
| JP | 09-24210 | 1/1997 |
| JP | 2003-249249 | 9/2003 |
| JP | 4113715 | 4/2008 |
| JP | 2011-83744 | 4/2011 |
| JP | 2013-233499 | 11/2013 |

* cited by examiner

ION EXCHANGER

BACKGROUND OF THE INVENTION

The present invention relates to an ion exchanger.

When a fuel cell is installed in a vehicle, a cooling circuit, through which coolant flows to cool the fuel cell, is provided for the purpose of limiting the temperature increase of the fuel cell upon generation of electric power. However, when coolant cools the fuel cell, constituents of the coolant are decomposed by heating to produce ions, which increases the ions in the coolant. The ions may cause corrosion of metal or a decline in the function of the fuel cell. Thus, the cooling circuit is provided with an ion exchanger that removes ions from the coolant by adsorbing ions contained in the coolant.

Such ion exchangers are disclosed in, for example, Japanese Laid-Open Patent Publication No. 2011-83744, Japanese Laid-Open Patent Publication No. 2013-233499, and Japanese Patent No. 4113715. The ion exchangers each include a case, which is provided with an opening, an intake port, and a discharge port, an ion exchanging resin member, which is arranged in the case, and a cap, which is detachably attached to the opening of the case. Coolant is drawn in through the intake port and discharged through the discharge port. The ion exchanging resin member removes ions from the coolant. The cap closes the opening of the case. The coolant flowing through the cooling circuit flows into the case of the ion exchanger through the intake port. Ions are removed when the coolant travels through the ion exchanging resin member in the case. Ions are removed from coolant in this way, and the coolant flows out of the case (the cooling circuit) through the discharge port.

In the above-described ion exchangers, the ion exchanging resin members remove ions contained in coolant by adsorbing them. Thus, it is necessary to periodically replace the ion exchanging resin members. In the ion exchanger disclosed in Japanese Laid-Open Patent Publication No. 2011-83744, the opening of the case is formed to open downward at the lower end of the case. Thus, it is necessary to attach or detach the cap that closes the opening at the lower end of the case. In addition, it is necessary to replace the ion exchanging resin member in the case through the opening that is located at the lower end of the case. This decreases the workability when the ion exchanging resin member is replaced.

In the ion exchanger disclosed in Japanese Laid-Open Patent Publication No. 2013-233499, the opening of the case is formed to open upward at the upper end of the case. This configuration avoids decrease of workability unlike the previous case, in which the cap needs to be attached or detached at the lower end of the case, and the ion exchanging resin member in the case needs to be replaced through the opening located at the lower end of the case. However, the ion exchanger of publication No. 2013-233499 has the following problem. That is, the intake port through which coolant is drawn in is formed in the upper end portion of the case, and a pipe through which the coolant in the cooling circuit is drawn in is connected to the intake port. Thus, when the cap and the ion exchanging resin member are attached to or detached from the case, the pipe coupled to the intake port becomes an obstacle. This disturbs the work for replacing the ion exchanging resin member.

As known from the above matters, it is preferable for the opening, the intake port, and the discharge port to be arranged in the case in the following manner to limit decrease of workability in replacing the ion exchanging resin member. That is, as in the ion exchanger disclosed in Japanese Patent No. 4113715, the opening of the case is formed to open upward at the upper end of the case, and the intake port, through which coolant is drawn into the case, and the discharge port, through which coolant is discharged out of the case, are arranged in the lower portion of the case. This configuration allows the cap, which closes the opening of the case, to be attached or detached at the upper end of the case, and allows the ion exchanging resin member in the case to be replaced through the opening that is located at the upper end of the case. Furthermore, since the intake port and the discharge port are arranged in the lower portion of the case, when the cap and the ion exchanging resin member are attached to or detached from the case, pipes coupled to the intake port and the discharge port do not become obstacles.

Use of the ion exchanger of Japanese Patent No. 4113715 limits decrease of workability in replacing the ion exchanging resin member. However, it is difficult to discharge the air that enters the case during the replacement out of the case through the discharge port.

This is because air in the case accumulates on the inner top surface in the upper end portion of the cap by buoyancy when the coolant flows in the case, and at the same time, the coolant that travels through the ion exchanger is drawn into the case through the intake port, which is arranged in the lower portion of the case, and travels through the ion exchanging resin member, and, after that, the coolant flows out of the case through the discharge port, which is arranged in the lower portion of the case like the intake port.

Depending on the above-described flow of the coolant in the case, air that accumulates on the inner top surface in the upper end portion of the cap cannot be pushed to the discharger port. Thus, the air stays on the inner top surface in the upper end portion of the cap. Accumulation of air on the inner top surface in the upper end portion of the cap makes it difficult to adjust the flow rate of coolant traveling through the interior of the ion exchanger (in the case) at an appropriate value. This may cause adverse influence on removal of ions from coolant by the ion exchanger.

SUMMARY OF THE INVENTION

It is an objective of the present invention to provide an ion exchanger that limits accumulation of air on the inner top surface in the upper end portion of the cap.

A means to achieve the above objective will now be described.

To achieve the objective, an ion exchanger includes a case, an ion exchanging resin member, and a cap. The case is provided with an opening, an intake port, and a discharge port. The ion exchanging resin member is arranged in the cap. The cap is detachably attached to the opening of the case. The opening opens upward in the case. Coolant is drawn into the lower portion of the case through the intake port and discharged through the discharge port. The ion exchanging resin member removes ions from coolant. The cap closes the opening of the case. The ion exchanger further includes a tube member. The tube member is arranged in the case to extend vertically. The lower end aperture of the tube member is connected to the discharge port of the case, and the upper end aperture of the tube member faces the inner top surface in the upper end portion of the case.

DETAILED DESCRIPTION OF THE PREFERRED EMBODIMENTS

An ion exchanger according to one embodiment of the present invention will now be described with reference to FIGS. 1 to 7.

Figure 1:
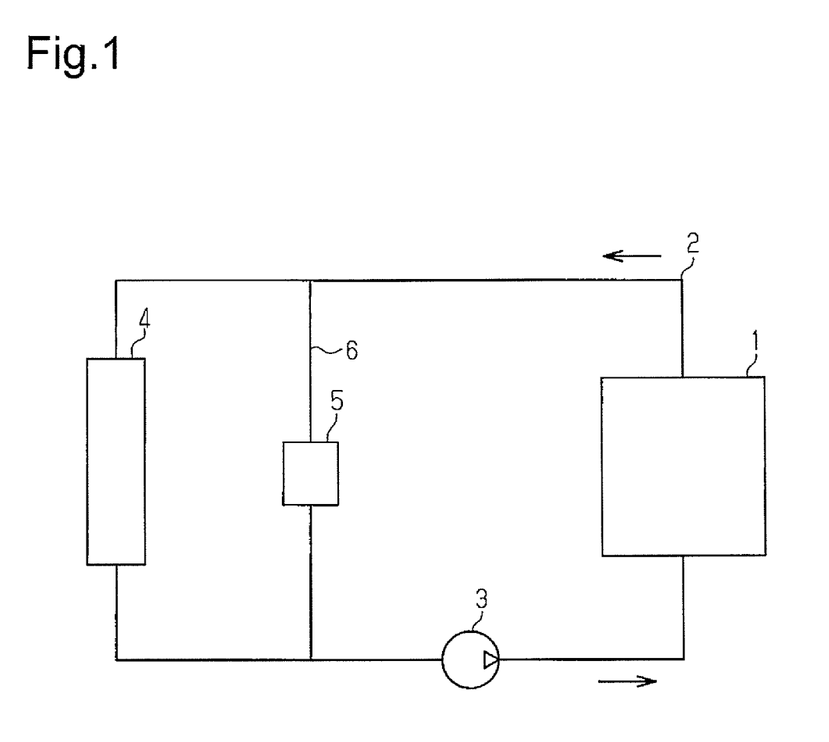
FIG. 1 is a schematic diagram illustrating the entire structure of a cooling circuit in which an ion exchanger is arranged.

As shown in FIG. 1, a vehicle on which a fuel cell 1 is mounted includes a cooling circuit 2 through which coolant for cooling the fuel cell 1 flows. Cooling water that contains ethylene glycol (long life coolant) or the like is used as such coolant. In the cooling circuit 2, coolant circulates by drive of a pump 3.

The fuel cell 1 is arranged in a downstream portion from the pump 3 of the cooling circuit 2. A radiator 4 is arranged in a portion that is located downstream from the fuel cell 1 and upstream from the pump 3. The temperature of the fuel cell 1 increases during generation of electric power, and cooling water circulates through the cooling circuit 2 and travels through the fuel cell 1 to cool the fuel cell 1. The coolant draws the heat of the fuel cell 1, and its temperature increases. The coolant at an increased temperature is cooled by outside air when traveling through the radiator 4. After that, the coolant flows toward the pump 3.

The cooling circuit 2 is provided with an ion exchanger 5 for removing ions from coolant by adsorbing ions contained in the coolant and a bypass pipe 6 through which the coolant is delivered to the ion exchanger 5. One of the ends of the bypass pipe 6 is coupled to a portion of the cooling circuit 2 that is located downstream from the fuel cell 1 and upstream from the radiator 4. The other end of the bypass pipe 6 is coupled to a portion of the cooling circuit 2 that is located downstream from the radiator 4 and upstream from the pump 3. The ion exchanger 5 is arranged in a portion of the bypass pipe 6.

In the cooling circuit 2, when the circulating coolant flows toward the downstream side from the fuel cell 1, a portion of the coolant does not flow toward the radiator 4 but flows into the bypass pipe 6. When the coolant that has entered the bypass pipe 6 in this way travels through the ion exchanger 5, ions are removed from the coolant. After that, the coolant flows through a portion of the cooling circuit 2 that is located downstream from the radiator 4 and upstream from the pump 3.

The structure of the ion exchanger 5 will now be described.

Figure 2:
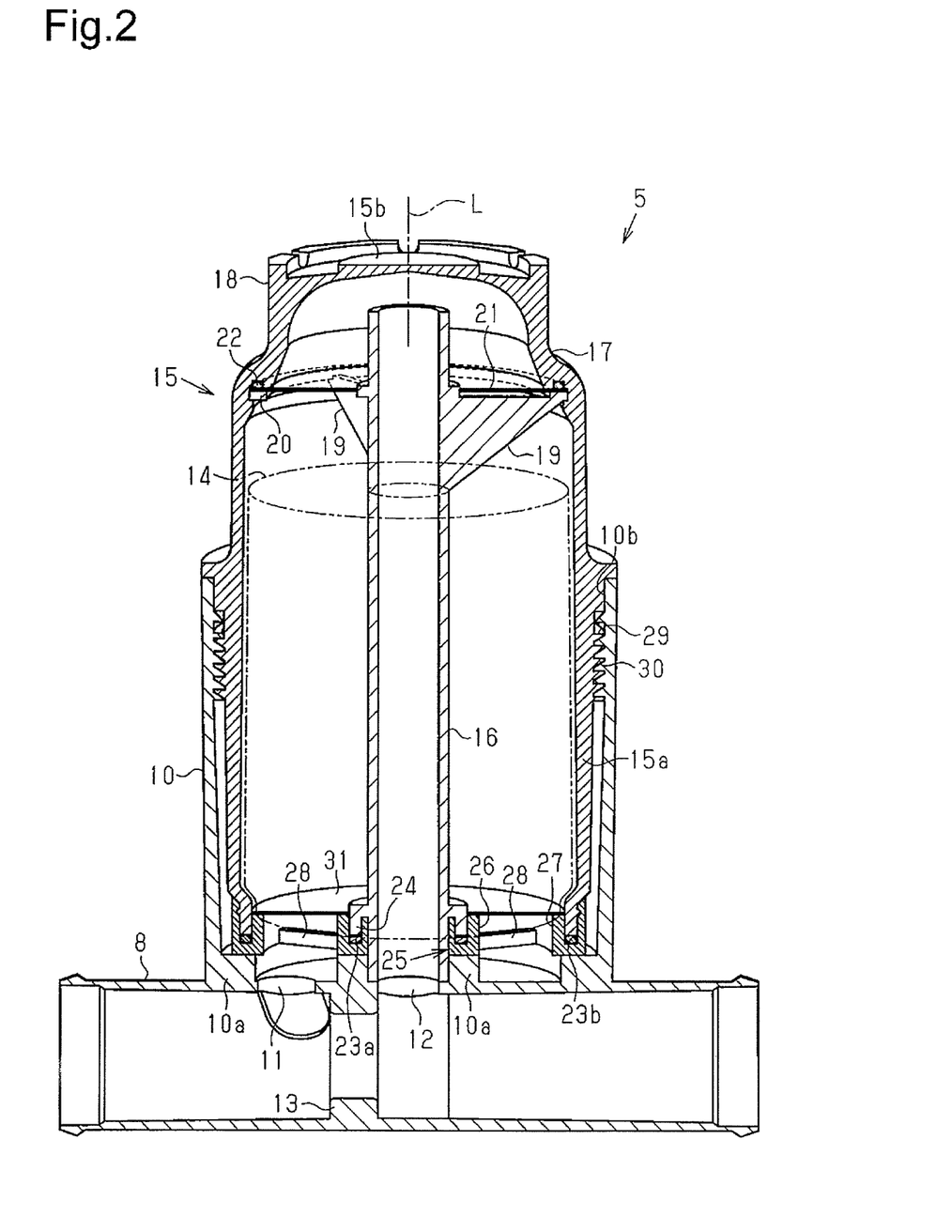
FIG. 2 is a cross-sectional view illustrating the structure of the ion exchanger.
Figure 3:
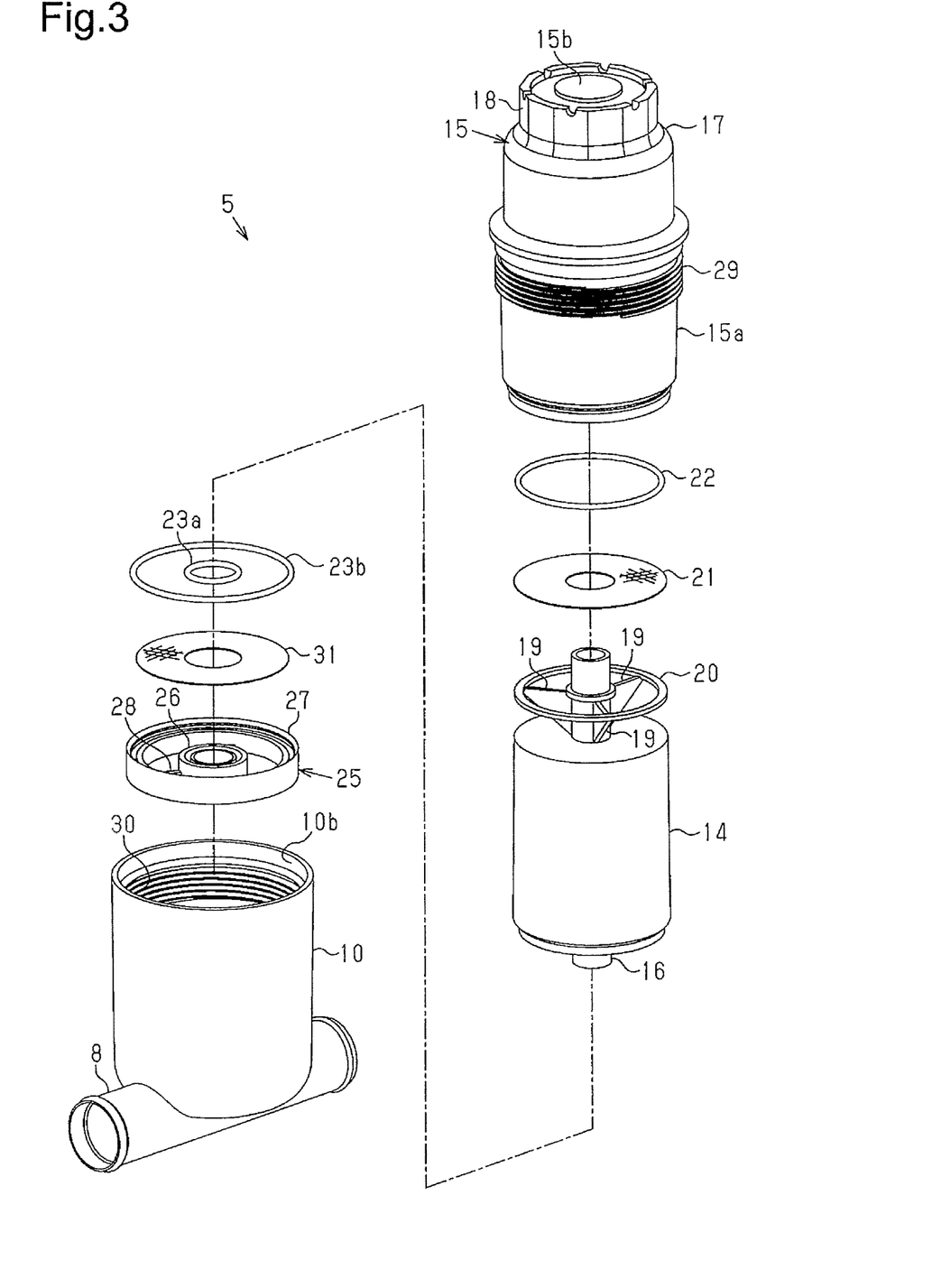
FIG. 3 is an exploded perspective view of the ion exchanger in which a cap is removed from the case.

As shown in FIGS. 2 and 3, the ion exchanger 5 includes a coolant pipe 8, which is connected to the bypass pipe 6 (FIG. 1), and a case 10, which extends in the vertical direction to be orthogonal to the coolant pipe 8. The case 10 has a tubular shape and is integrated with the coolant pipe 8 at the lower end portion.

As shown in FIG. 2, a partition wall 10a of the case 10 that separates the coolant pipe 8 from the case 10 includes an intake port 11, which allows the interior of the coolant pipe 8 to communicate with the interior of the case 10 to draw the coolant in the coolant pipe 8 into the case 10. The partition wall 10a includes a discharge port 12 on the downstream side from the intake port 11 in the flowing direction of the coolant in the coolant pipe 8 (the right side direction in FIG. 2). The discharge port 12 allows the interior of the case 10 to communicate with the interior of the coolant pipe 8 to discharge the coolant in the case 10 to the coolant pipe 8. A decreased diameter portion 13 is arranged in a portion of the coolant pipe 8 that is located between the intake port 11 and the discharge port 12. The decreased diameter portion 13 has a flow area of coolant smaller than the flow area of the other portion of the coolant pipe 8.

The ion exchanger 5 includes an ion exchanging resin member 14, which is provided in the case 10, and a cap 15, which is detachably attached to the case 10. The ion exchanging resin member 14 removes ions from coolant by adsorbing the ions contained in the coolant. The case 10 has an opening 10b, which opens upward at the upper end of the case 10. The cap 15 is attached to the case 10 to close the opening 10b. In addition, the ion exchanger 5 also includes a tube member 16, which is arranged to extend vertically in the case 10. The lower end aperture of the tube member 16 is connected to the discharge port 12, and the upper end aperture of the tube member 16 is located to be opposed to the inner top surface in the upper end portion of the cap 15.

The cap 15, the ion exchanging resin member 14, and the tube member 16 are included in a cartridge in the following manner so that they are attached to or detached from the case 10 together. In other words, the cap 15 includes a tubular body portion 15a, which extends vertically, and a lid portion 15b, which is arranged at the upper end of the body portion 15a to close the upper end. The ion exchanging resin member 14 is accommodated inside the body portion 15a. The tube member 16 vertically extends through the ion exchanging resin member 14. In this state, the body portion 15a holds the tube member 16. Furthermore, in the state in which the tube member 16 vertically extends through the ion exchanging resin member 14, the ion exchanging resin member 14 is fixed to the tube member 16.

The detailed structure of the cap 15 will be described, which includes a structure of holding the tube member 16 in the body portion 15a of the cap 15.

The inner top surface in the upper end portion of the cap 15 (the inner top surface of the lid portion 15b) is tapered such that the diameter around the central axis L of lid portion 15b decreases toward the upper end. A step 17 is arranged at the upper end of the body portion 15a to decrease the diameter of the lid portion 15b, which allows a dismounting tool to be attached to the lid portion 15b. A polygonal mounting surface 18, to which a dismounting tool is attached, is formed on the outer circumference of the lid portion 15b. An edge and a corner appear in a portion of the inner circumferential surface in the upper end portion of the cap 15 that corresponds to the step 17 when forming the step 17. However, the edge and the corner are formed to have arc-shaped cross sections so that the edge and the corner are restricted from causing resistance when coolant flows inside the upper end portion of the cap 15.

The tube member 16 has an inner diameter uniform in the extending direction of the tube member 16. Three supporting portions 19 (only two supporting portions 19 are shown in FIG. 2) are arranged on the outer circumferential surface in the upper end portion of the tube member 16 at equal intervals in the circumferential direction. A ring portion 20, which has a central axis coinciding with the central axis of the tube member 16, is integrally formed with the supporting portions 19 at the distal ends of the supporting portions 19 in the projecting direction. A disc-shaped mesh 21, through which the tube member 16 extends, is arranged on the upper surface of the ring portion 20. A seal ring 22 is arranged on the upper surface in the outer circumferential portion of the mesh 21. The mesh 21 and the seal ring 22 are held between the upper surface of the ring portion 20 and the lower surface of the step 17.

As described above, the tube member 16 vertically extends through the ion exchanging resin member 14, which is accommodated inside the body portion 15a of the cap 15. Thus, the lower end portion of the tube member 16 extends downward from the lower surface of the ion exchanging resin member 14 and extends through the central portion of the disc-shaped mesh 31, which contacts the lower surface of the ion exchanging resin member 14. A hook portion 24 is formed on the outer circumferential surface in the lower end portion of the tube member 16. The hook portion 24 extends along the outer circumferential surface to have an annular shape and projects downward. Seal rings 23a and 23b are in contact with the lower end surface (the distal end surface) of the hook portion 24 and the lower end surface of the body portion 15a. A bottom member 25 is attached to the lower end portion of the hook portion 24 and the lower end portion of the body portion 15a.

The bottom member 25 includes an annular inner circumferential portion 26, an annular outer circumferential portion 27, and a connection portion 28. The inner circumferential portion 26 is fitted to the lower end portion of the hook portion 24 of the tube member 16. The outer circumferential portion 27 is fitted to the lower end portion of the body portion 15a of the cap 15. The connection portion 28 radially extends between the inner circumferential portion 26 and the outer circumferential portion 27 around the tube member 16. The connection portion 28 connects the inner circumferential portion 26 with the outer circumferential portion 27. Three connection portions 28 (only two connection portions are shown in FIG. 2) are arranged around the outer circumferential surface of the tube member 16 at equal intervals.

The inner circumferential portion 26 and the outer circumferential portion 27 of the bottom member 25 are fitted to the lower end portion of the hook portion 24 and the lower end portion of the body portion 15a. This holds the seal ring 23a between the inner circumferential portion 26 and the lower end of the hook portion 24 and holds the seal ring 23b between the outer circumferential portion 27 and the lower end of the body portion 15a. Further, at this time, the mesh 31 is held between the inner circumferential portion 26 and the ion exchanging resin member 14 and between the outer circumferential portion 27 and the ion exchanging resin member 14. In this way, by fixing the bottom member 25 to the lower end portion of the hook portion 24 and the lower end portion of the body portion 15a, the cap 15, the ion exchanging resin member 14, and the tube member 16 are included in a cartridge.

An external thread 29 is formed on the outer circumferential surface of the body portion 15a of the cap 15, and an internal thread 30, which can be screwed with the external thread, is formed on the inner circumferential surface of the case 10. The cap 15, which is included in a cartridge as described above, is attached to the case 10 by screwing the external thread 29 of the body portion 15a into the internal thread 30 of the case 10. When such attachment is performed, a portion of the interior of the case 10 that is connected to the intake port 11 communicates with a portion of the bottom member 25 between the inner circumferential portion 26 and the outer circumferential portion 27, while the lower end aperture of the tube member 16 is connected to the discharge port 12. At this time, the upper end aperture of the tube member 16 faces the upper end portion in the tapering portion on the inner top surface (a portion of the lid portion 15b that corresponds to the central axis L), which is the inner top surface of the lid portion 15b of the cap 15.

FIG. 3 illustrates a state in which the cartridge including the cap 15 and the like is disassembled by detaching the cartridge from the case 10 of the ion exchanger 5.

Operation of the ion exchanger 5 will now be described.

The coolant that flows through the coolant pipe 8 includes coolant that flows downstream from the decreased diameter portion 13 after traveling through the decreased diameter portion 13 and coolant that flows downstream from the decreased diameter portion 13 after traveling through the ion exchanger 5 without traveling through the decreased diameter portion 13. The coolant that does not travel through the decreased diameter portion 13 flows into the case 10 of the ion exchanger 5 through the intake port 11. After traveling through the mesh 31, the coolant travels upward through the ion exchanging resin member 14 and reaches the upper end portion of the interior of the cap 15. In this way, when the coolant travels through the ion exchanging resin member 14, ions contained in the coolant are adsorbed by the ion exchanging resin member 14, so that the ions are removed from the coolant. The coolant after the ions are removed enters the tube member 16 from the upper end aperture of the tube member 16 in the upper end portion of the interior of the cap 15 and flows to the exterior of the case 10 (the inside of the coolant pipe 8) from the discharge port 12 through the interior of the tube member 16.

Replacement of the ion exchanging resin member 14 is performed in the following procedure. That is, a dismounting tool is attached to the mounting surface 18 of the lid portion 15b that is located in the upper end portion of the case 10. The cap 15 (lid portion 15b) is turned counterclockwise around the central axis L using the dismounting tool, and the external thread 29 of the cap 15 is unscrewed from the internal thread 30 of the case 10. In a state in which the external thread 29 has been unscrewed from the internal thread 30, the cap 15 is pulled upward from the opening 10b that is located at the upper end of the case 10, so that the cartridge including the cap 15, the ion exchanging resin member 14, and the tube member 16 is detached from the case 10 at once. In this detaching, the coolant existing in the cap 15 drops and accumulates in the case 10. The height of the case 10 is preset such that the coolant does not spill out of the case 10 at that time.

After that, the cartridge on which a new ion exchanging resin member 14 is mounted, i.e., a cartridge including the cap 15, the ion exchanging resin member 14, the tube member 16, and the like, is inserted into the opening 10b of the case 10. In this state, turning the cap 15 clockwise around the central axis L engages the external thread 29 of the cap 15 to the internal thread 30 of the case 10 to attach the cartridge to the case 10. With such replacement of the ion exchanging resin member 14, if air enters the interior of the case 10, the air gathers in the upper end portion in the tapering portion on the inner top surface (a portion of the lid portion 15b that corresponds to the central axis L), which is the inner top surface of the lid portion 15b of the cap 15 with buoyancy when the coolant travels through the interior of the case 10.

The upper end aperture of the tube member 16 faces the upper end portion in the tapering portion on the inner top surface of the lid portion 15b of the cap 15. Thus, the coolant traveling through the interior of the case 10, flows between the upper end portion in the tapering portion on the inner top surface of the lid portion 15b and the upper end aperture of the tube member 16 and flows into the tube member 16 from the upper end aperture. Accordingly, air that has accumulated on the inner top surface of the lid portion 15b of the cap 15 is pushed by the flow of the coolant in the case 10 to the discharge port 12 and discharged out of the case 10 through the discharge port 12. As a result, accumulation of air on the inner top surface of the lid portion 15b of the cap 15 is limited.

The example values of the dimensions of parts of the ion exchanger 5 are listed below. Specifically, the listed values include the flowing area FS of the coolant in the decreased diameter portion 13, the inclination angle θ of the tapering portion on the inner top surface of the lid portion 15b, the inner diameter d of the tube member 16, the outer diameter D and the height h of the ion exchanger 5, and the gap length t between the upper end of the tube member 16 and the inner top surface of the lid portion 15b.

Figure 4:
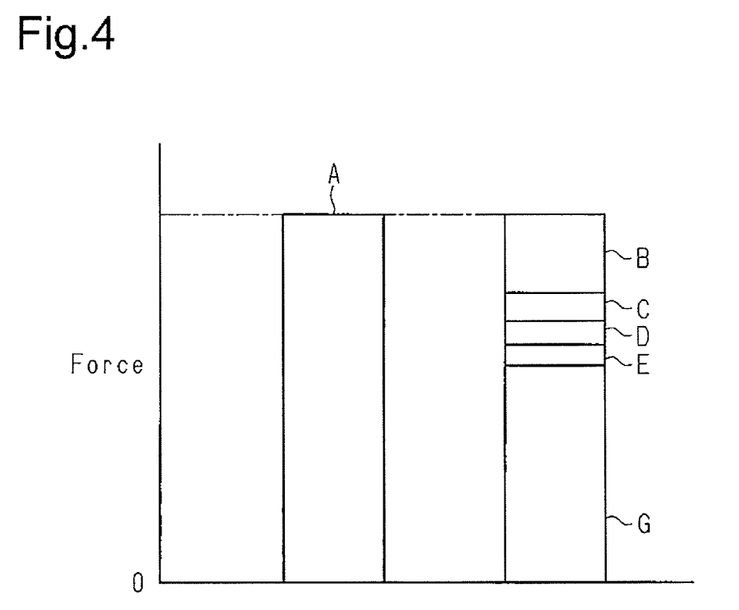
FIG. 4 is a graph showing the magnitude of force A based on pressure difference between an upstream portion and a downstream portion from the decreased diameter portion of a coolant pipe.

FIG. 4 shows the magnitude of force A based on the pressure difference between the upstream portion and the downstream portion from the decreased diameter portion 13 of the coolant pipe 8. The force A is for causing coolant in the case 10 of the ion exchanger 5 to flow out through the discharge port 12 after the coolant is delivered into the case 10. The magnitude of the force A is proportional to the size of the flow area FS of the coolant in the decreased diameter portion 13. The flow area FS is set such that the force A has a value greater than the total value of the following force by an allowance value G. That is, the force A is set to be greater, by the allowance value G, than the total value of force B of pressure loss due to the case 10 and the cap 15 when coolant flows in the ion exchanger 5, force C of pressure loss with change in the height location of the coolant that flows in the ion exchanger 5, buoyancy D of air accumulating in the ion exchanger 5, and force E based on the specific gravity difference between the air and the coolant.

Figure 5:
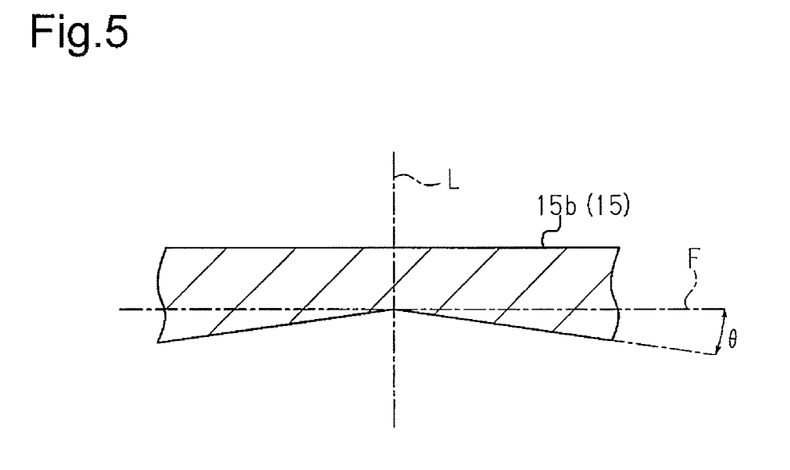
FIG. 5 is a schematic diagram illustrating an inclination angle θ of a tapering portion at the inner top surface of the lid portion of the cap.

As shown in FIG. 5, the tapering portion on the inner top surface of the lid portion 15b is inclined relative to the plane F that is orthogonal to the central axis L of the lid portion 15b. The inclination angle θ of the tapering portion relative to the plane F has a value such that it is easier for air that is in contact with the tapering portion to gather in the upper end portion in the tapering portion (a portion corresponding to the central axis L). For example, the inclination angle θ is set to 8°.

Figure 6:
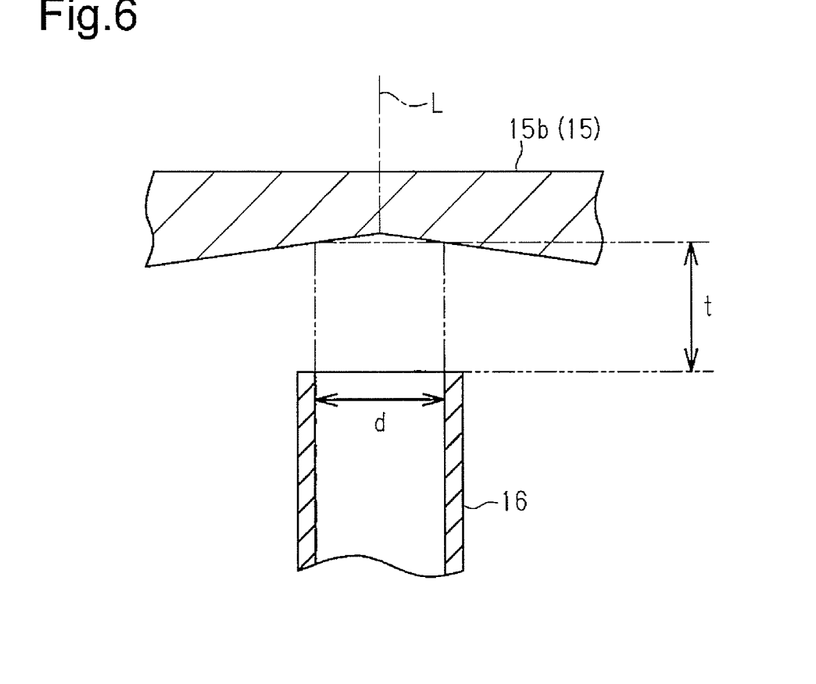
FIG. 6 is a schematic diagram illustrating the inner diameter d of a tube member and the gap length t between the upper end of the tube member and the inner top surface of the lid portion.
Figure 7:
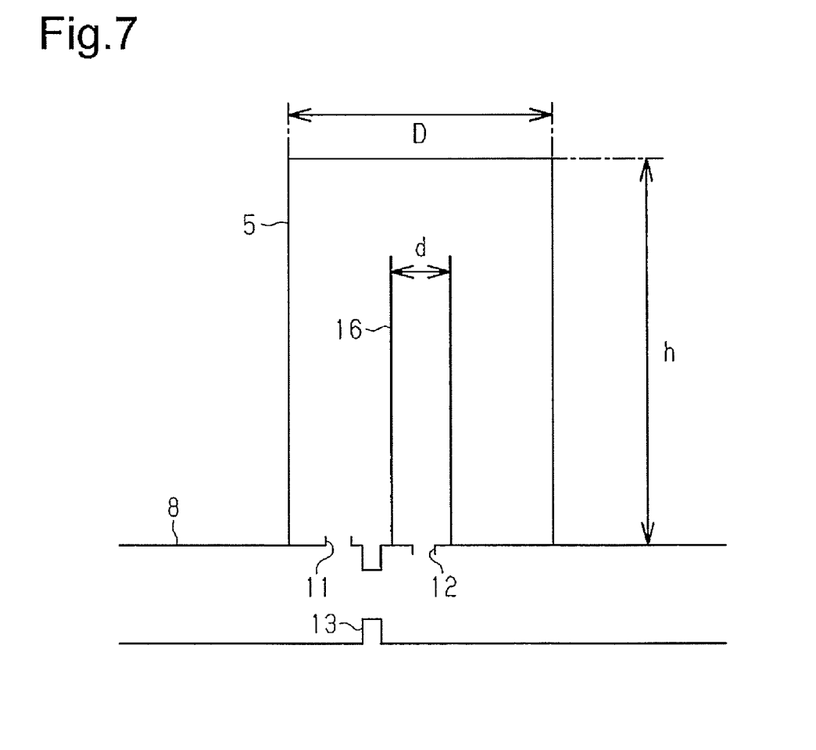
FIG. 7 is a schematic diagram illustrating the outer diameter D and the height h of the ion exchanger and the inner diameter d of the tube member.

FIGS. 6 and 7 show the inner diameter d of the tube member 16, gap length t between the upper end of the tube member 16 and the inner top surface of the lid portion 15b, and the outer diameter D and the height h of the ion exchanger 5.

The area of the upper end aperture of the tube member 16 has a value of $n \cdot (d/2)^2$ when expressed with the inner diameter d. Here, n expresses the circular constant, and $^2$ expresses square. The same applies to the expressions n and $^2$ below. The lateral area of a cylinder obtained by extending the inner circumferential surface of the upper end aperture of the tube member 16 to the inner top surface of the lid portion 15b has a value of $n \cdot d \cdot t$ when expressed with the inner diameter d and the length t. The inner diameter d and the length t have values that satisfy all of the following formulas $n \cdot (d/2)^2 > n \cdot d \cdot t$, $d \neq 0$, and $t \neq 0$. Moreover, the inner diameter d, the outer diameter D, and the height h have values that satisfy all of the following formulas D:d:h=1:X:Y, X=0.13 to 0.24, and Y=1.0 to 2.0.

By setting the flow area FS, the inclination angle θ, the inner diameter d, the height t, the outer diameter D, and the length t in the above described manner, air that accumulates on the inner top surface of the lid portion 15b is effectively pushed by coolant traveling through the ion exchanger 5 and flows into the upper end aperture of the tube member 16.

The above-illustrated embodiment achieves the following advantages.

(1) Accumulation of air on the inner top surface in the upper end portion of the cap 15 in the ion exchanger 5, that is, the inner top surface of the lid portion 15b of the cap 15, is limited.

(2) Adjustment of the flow area FS of coolant in the decreased diameter portion 13 of the coolant pipe 8 changes the magnitude of force A based on the pressure difference between the upstream portion and the downstream portion from the decreased diameter portion 13 of the coolant pipe 8. Therefore, the flow rate of the coolant that travels through the interior of the case 10 can be adjusted by changing the magnitude of the force A through adjustment of the flow area FS.

(3) The cap 15, the ion exchanging resin member 14, and the tube member 16 are included in a cartridge. Thus, they are attached to or detached from the case 10 at once. This facilitates the work in replacement of the ion exchanging resin member 14.

(4) The diameter of the lid portion 15b is decreased by providing the step 17 at the upper end portion of the body portion 15a of the cap 15. This forms the mounting surface 18, which allows a dismounting tool to be attached. Thus, the dismounting tool is attached to the mounting surface 18 of the lid portion 15b, and the cap 15, the ion exchanging resin member 14, the tube member 16, which are included in a cartridge, can be detached at once using the dismounting tool.

(5) The inner top surface of the lid portion 15b of the cap 15 is formed in a tapered manner, in which the diameter of the inner top surface is decreased upward. This facilitates accumulation of air in the case 10 in the upper end portion in the tapering portion on the inner top surface of the lid portion 15b with buoyancy. Moreover, the upper end aperture of the tube member 16 faces the upper end portion in the tapering portion on the inner top surface of the lid portion 15b. Thus, air accumulating in the upper end portion is effectively pushed by the flow of coolant in the case 10 to flow into the upper end aperture of the tube member 16. As a result, the air is effectively discharged out of the case 10 through the discharge port 12, which is connected to the tube member 16.

(6) The coolant that travels through the ion exchanger 5 travels upward through the ion exchanging resin member 14 in the case 10. After that, the coolant flows from the upper end aperture of the tube member 16 to the discharge port 12. By forming such flow of the coolant in the case 10, the ion exchanging resin member 14 is effectively used to remove ions from the coolant. As a result, the replacement period of the ion exchanging resin member 14 is extended.

The above-illustrated embodiment may be modified in the following forms, for example.

In the cap 15, the inner top surface of the lid portion 15b does not necessarily need to be formed in a tapered manner.

For example, the inner top surface of the lid portion 15b may be formed in a curved manner to be depressed upward such that a portion corresponding to the central axis L of the lid portion 15b is an upper end.

In the coolant pipe 8, a block portion that blocks between the intake port 11 and the discharge port 12 may be provided instead of the decreased diameter portion 13. Thus, the cooling circuit 2 has the function of the decreased diameter portion 13 to adjust the flow rate of coolant that travels through the interior of the case 10. For example, it is suggested to provide a mechanism that adjusts the flow rate of coolant flowing through the coolant pipe 8 such as a flow rate adjustment valve in the bypass pipe 6.

The inner diameter of the tube member 16 does not necessarily need to be uniform in the direction in which the tube member 16 extends. The inner diameter of the tube member 16 may be decreased toward the lower end aperture from the upper end aperture of the tube member 16. In contrast, the inner diameter of the tube member 16 may be increased toward the lower end aperture from the upper end aperture.

The invention claimed is:

1. An ion exchanger comprising:
   a case that has an opening that opens upward, the case including, in a lower portion, an intake port through which coolant is drawn in and a discharge port through which the coolant is discharged;
   an ion exchanging resin member that is arranged in the case and removes ions from the coolant, the ion exchanging resin member comprising a porous body that allows passage of coolant to remove the ions;
   a cap that is detachably attached to the case and closes the opening of the case; and
   a tube member having first and second ends, the tube member being arranged to extend in a vertical direction within the case, wherein
   the first end of the tube member includes a lower end aperture, the lower end aperture being connected to the discharge port,
   the second end of the tube member includes an upper end aperture,
   the second end of the tube member protrudes from an upper end surface of the ion exchanging resin member such that the upper end aperture faces an inner top surface in an upper end portion of the cap,
   the cap includes a tubular body portion, through which the coolant is configured to flow, that extends in the vertical direction and a lid portion that is arranged at an upper end of the tubular body portion,
   wherein at least a portion of the porous body of the ion exchanging resin member is accommodated inside the tubular body portion,
   the lid portion closes the upper end of the tubular body portion, and
   the tubular body portion holds the tube member such that the tube member extends through the porous body of the ion exchanging resin member in the vertical direction.

2. The ion exchanger according to claim 1, wherein
   the case is integrally formed with a coolant pipe through which the coolant flows,
   the intake port is arranged in a partition wall of the case that separates the coolant pipe from the case and allows the interior of the coolant pipe to communicate with the interior of the case,
   the discharge port is arranged on a downstream side from the intake port of the partition wall in a direction in which the coolant flows through the coolant pipe and allows the interior of the coolant pipe to communicate with the interior of the case, and
   a decreased diameter portion is arranged in a portion of the coolant pipe between the intake port and the discharge port, the decreased diameter portion having a flow area of the coolant smaller than a portion of the coolant pipe leading to the decreased diameter portion.

3. The ion exchanger according to claim 1, wherein
   the cap includes a step in the upper end portion of the tubular body portion to decrease the diameter of the lid portion, and
   the step allows a dismounting tool to be attached to the lid portion.

4. The ion exchanger according to claim 1, wherein
   the inner top surface in the upper end portion of the cap is formed in a tapered manner in which a diameter of the inner top surface is decreased upward, and
   the upper end aperture of the tube member faces an upper end portion on the inner top surface in the upper end portion of the cap.

5. The ion exchanger according to claim 1, wherein the second end of the tube member is positioned within a dome shaped interior region of the cap.

6. The ion exchanger according to claim 2, wherein the coolant pipe extends in an extending direction that intersects the vertical direction, opposite ends of the coolant pipe in the extending direction are open, and the decreased diameter portion opens in the extending direction.

* * * * *